United States Patent [19]

Weir et al.

[11] Patent Number: 4,832,925
[45] Date of Patent: * May 23, 1989

[54] RECOVERY OF ZINC FROM ZINC-CONTAINING SULPHIDIC MATERIAL

[75] Inventors: Donald R. Weir; Ian M. Masters; Barry N. Doyle, all of Fort Saskatchewan, Canada

[73] Assignee: Sherritt Gordon Mines Limited, Toronto, Canada

[*] Notice: The portion of the term of this patent subsequent to Apr. 17, 2001 has been disclaimed.

[21] Appl. No.: 514,733

[22] Filed: Jul. 18, 1983

[30] Foreign Application Priority Data

Jul. 27, 1982 [GB] United Kingdom ............... 8221662

[51] Int. Cl.⁴ .................. C22B 19/00; C01G 5/00; C01G 21/00; C01B 17/02
[52] U.S. Cl. ....................... 423/141; 75/101 R; 75/115; 75/120; 423/109; 423/110
[58] Field of Search ............. 423/109, 110, 141; 75/101 R, 115, 120; 204/119, 115

[56] References Cited

U.S. PATENT DOCUMENTS 1,069,179  8/1913  Reed ............................ 423/109
3,477,927  11/1969  Veltman et al. ............... 423/109
4,440,569  4/1984  Weir et al. ..................... 75/120
4,443,253  4/1984  Weir et al. ..................... 423/109
4,505,744  3/1985  Weir et al. ..................... 75/101 R

OTHER PUBLICATIONS

The Soviet Journal of Non Ferrous Metals, vol. 6, No. 5 (of English Translation), Trans. by Primary Sources, Yaroslavtsev et al., pp. 31–34, 1965.
"Oxidative Pressure Leaching of Zinc Concentrates", E. G. Parker, CIM Bulletin, May 1981.

Primary Examiner—John Doll
Assistant Examiner—Jeffrey Edwin Russel
Attorney, Agent, or Firm—Robert F. Delbridge; Arne I. Fors

[57] ABSTRACT

A process for the recovery of zinc from zinc-containing sulphidic material which also contains iron and from zinc oxide containing material, at least one of the materials containing lead and/or silver values. The process includes leaching zinc-containing sulphidic material and zinc oxide containing material under pressurized oxidizing conditions at a temperature in the range of from about 130° to about 170° C. in aqueous sulphuric acid solution with a stoichiometric excess of sulphuric acid relative to the zinc content of the materials of from about 40 to about 100% to produce a residue containing a major proportion of lead and/or silver values and a leach solution containing a major proportion of the zinc and iron. The residue is separated from the leach solution and treated to recover lead and/or silver values. The pH of the solution is then raised to neutralize the acid in an iron removal step to cause precipitation of at least some of the dissolved iron from the leach solution as an iron compound. The precipitated iron compound is separated from the remaining leach solution, and the remaining leach solution is treated to recover zinc.

4 Claims, 1 Drawing Sheet

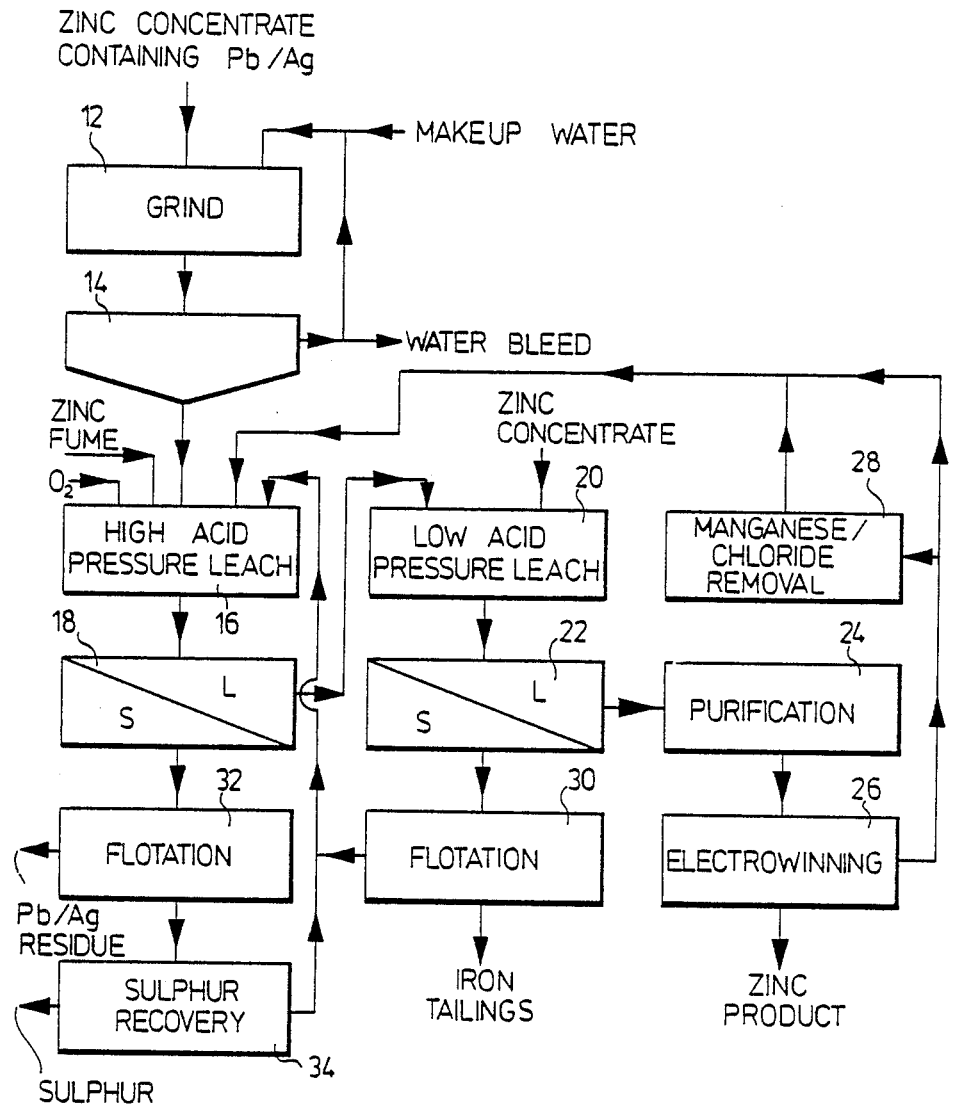

RECOVERY OF ZINC FROM ZINC-CONTAINING SULPHIDIC MATERIAL

This invention relates to the recovery of zinc from zinc-containing sulphidic material which also contains iron and from zinc oxide containing material, when at least one of these materials also contains lead and/or silver.

It is known to recover zinc from zinc-containing sulphidic material by leaching the material under oxidizing conditions at elevated temperature in aqueous sulphuric acid solution to provide an undissolved residue and a leach solution containing dissolved zinc. After separation from the residue and after carrying out any necessary purification steps, the leach solution is electrolyzed to produce elemental zinc. Most zinc-containing sulphidic material normally also contains iron, and it is known that the presence of iron is desirable because it assists the oxidation leaching of sulphidic material and hence assists in obtaining adequate dissolution of zinc. To further assist the dissolution of zinc, it is usual for the leach to be commenced with a slight stoichiometric excess of sulphuric acid relative to the amount of zinc in the zinc-containing material, for example with about 10% excess of sulphuric acid.

However, with such a stoichiometric excess of acid, some iron is also dissolved, and thus is present in the leach solution. Because the subsequent zinc electrolysis step requires that the zinc-containing solution to be electrolyzed be substantially iron-free, it has been necessary to remove iron in a purification step, even though the leach may have been conducted in such a way that a minimal amount of iron is dissolved.

Zinc-containing sulphidic material may, in addition to zinc, also contain lead and/or silver, and in some cases the lead and/or silver content may be sufficiently high to render recovery of one or both of these metals economically desirable. In zinc recovery processes such as described above, substantially all of the lead and/or silver remains in the leach residue together with most of the iron. The presence of iron in the residue complicates the subsequent recovery of lead and/or silver therefrom.

According to the present invention, zinc-containing sulphidic material which also contains iron is leached in aqueous sulphuric acid solution together with zinc oxide containing material, at least one of the materials containing lead and/or silver. The mixture of materials is leached under pressurized oxidizing conditions at a temperature in the range of from about 130° to about 170° C. in aqueous sulphuric acid solution with a stoichiometric excess of sulphuric acid relative to the zinc content of the materials of from about 40% to about 100% to produce a residue containing a major proportion of lead and/or silver and a leach solution containing a major proportion of the zinc and iron. The residue is separated from the leach solution and treated to recover lead and/or silver values. Zinc-containing sulphidic material is added to the leach solution to neutralize the acid and cause precipitation of at least some of the dissolved iron from the leach solution. The precipitated iron compound and undissolved zinc containing sulphidic material are separated from the remaining leach solution and the remaining leach solution is treated to recover zinc.

Thus, the residue containing a major proportion of lead and/or silver is relatively iron-free, and therefore the recovery of lead and/or silver therefrom is facilitated. The addition of zinc containing sulphidic material to the leach solution to neutralize the acid may be caused to precipitate most of the dissolved iron from the leach solution, with the result that it may not be necessary to subject the remaining leach solution to a subsequent iron removal step before zinc is recovered therefrom. Advantageously, the iron removal step is also carried out at a temperature in the range of from about 130° to about 170° C. under pressurized oxidizing conditions. If a subsequent iron removal step is necessary, then zinc oxide containing material may be added to the remaining leach solution for this purpose, with the precipitated iron compound subsequently being separated therefrom.

The residue containing a major proportion of the lead and/or silver also contains elemental sulphur and undissolved zinc containing sulphidic material. The process may therefore also comprise separating the material containing the lead and/or silver from the remaining residue, separating elemental sulphur from the undissolved zinc containing sulphidic material, and recycling the undissolved zinc-containing sulphidic material to the leaching of the mixture of zinc containing materials.

Also, the precipitated iron compound may be separated from the undissolved zinc-containing sulphidic material, and the undissolved zinc containing sulphidic material recycled to the leaching of the mixture of zinc containing materials.

One embodiment of the invention will now be described, by way of example, with reference to the accompanying drawing which shows a diagrammatic view of a zinc recovery process. Referring to the accompanying drawing, the process in accordance with this embodiment of the invention is used to recover zinc from zinc-containing sulphidic concentrate and from zinc oxide fume. The zinc sulphidic concentrate contains by weight about 55% zinc, about 31% sulphur, about 7% iron, about 2% lead, about 0.1% copper, and about 80 ppm silver. The zinc oxide fume contains about 68% zinc, about 10% lead, and about 20 ppm silver.

The zinc concentrate is ground in a grinding step 12 to a small size, for example at least about 95% <325 Tyler mesh (44 microns). Water is added in the grinding step 12, and the resulting ground concentrate slurry is thickened in a thickener 14 to about 70% solids by weight. Up to about 75% of the chloride present in the concentrate is dissolved during the grinding step 12, and a portion of thickener overflow is bled from the system to remove chloride ions, the main portion of the thickener overflow being returned to the grinding step 12 with the addition of makeup water.

The concentrate slurry then passes to a high acid pressure leach step 16 to which zinc oxide fume is also added, the proportion of zinc concentrate to zinc oxide fume by weight preferably being from about 1.1:1 to about 1.3:1. Unreacted zinc sulphidic material from subsequent steps is also added as will be described later. The mixture of zinc concentrate and zinc fume is leached in the leach step 16 in an autoclave in aqueous sulphuric acid solution from a zinc electrolysis step which will be referred to later, such that there is an initial stoichiometric excess of sulphuric acid relative to the zinc in the mixture of materials of about 50%. The leach step 16 is carried out under a partial oxygen pressure of about 700 kPa at a temperature of about 150° C.

The leach step 16 is carried out until over about 97% of the zinc in the zinc concentrate and zinc fume has dissolved, with a correspondingly high amount of iron also being dissolved. The residue then contains little iron, and does contain substantially all the lead and silver in the original materials, together with elemental sulphur and unreacted zinc concentrate.

The leached slurry then passes to a liquid/solids separation step 18, from which the leach solution proceeds to a low acid pressure leach step 20 to which zinc concentrate is added to neutralize the acid. Preferably the zinc concentrate used in this step contains as little lead and/or silver as possible. This increase in pH causes most of the dissolved iron to be precipitated, and such iron precipitation also assists in precipitation of arsenic, antimony, fluoride and other impurities which may have been present in the zinc concentrate or zinc fume and have become dissolved in the high acid pressure leach step 16. The low acid pressure leach step 20 is carried out at a temperature of about 150° C.

The resultant leach slurry then passes to a liquid/solids separation step 22 from which the leach solution proceeds to a purification step 24 where the leach solution is purified in known manner, for example by the addition of zinc dust to cause cementation of impurities, and the purified leach solution passes to an electrolysis step 26 from which elemental zinc is obtained. The leach solution passed to the electrolysis step 26 will typically contain about 150 g/L zinc and have a pH of about 5 and, after electrolysis, the spent electrolyte solution will typically contain about 50 g/L zinc and about 180 g/L sulphuric acid. The spent solution is recycled to the high acid pressure leach 16. A portion of the recycled solution is treated with ozone in a manganese and chloride removal step 28 to remove dissolved manganese and chloride as manganese dioxide and chlorine gas, this step being the subject of our U.S. Pat. No. 4,290,866, issued Sept. 22, 1981 and our U.S. Pat. No. 4,379,037 issued Apr. 5, 1983.

The solids from the liquid/solids separation step 22 consists primarily of precipitated iron compounds, elemental sulphur and unreacted zinc concentrate. These solids are passed to a flotation step 30 where these components are separated, the unreacted zinc concentrate and elemental sulphur being recycled to the high acid pressure leach 16 and the iron compound being disposed of as desired. If the zinc concentrate used in the low acid pressure leach step 20 contains lead and/or silver, then the iron compound obtained in the flotation step 30 may also contain lead and/or silver. In this case, the iron compound may be roasted, and the calcine treated to recover lead and/or silver.

The solids from the liquid/solids separation step 18 proceed to a flotation step 32 in which a lead/silver enriched residue is separated from the remaining residue. The lead/silver enriched residue typically contains at least 50% lead, less than 5% iron and up to 2,000 ppm silver, and is suitable for treatment in a lead smelter, for example a smelter using the Kivcet process as described in the article entitled "The technical-scale realization of the Kivcet Process for lead" by Chaudhuri et al published in the CIM Bulletin of May, 1980. The zinc oxide fume used in the high acid pressure leach step 16 may be obtained from such a smelter. Also, sulphur dioxide produced in a Kivcet smelter may be used to produce sulphuric acid.

The remaining residue consisting primarily of elemental sulphur and unreacted zinc concentrate may be treated in a sulphur recovery step 34 in which the elemental sulphur is melted and separated from the unmelted fraction by filtration to produce a high grate sulphur product, and a filter cake containing unreacted zinc concentrate which is recycled to the high acid pressure leach 16.

EXAMPLES

Example 1

Series of Acid Pressure Leach Tests on Zinc Concentrate and Zinc Oxide Fume

A series of pressure leach tests were conducted on a mixture of zinc sulphide concentrate and zinc oxide fume in order to determine the effect of the acid:zinc ratio on zinc and iron extractions.

The zinc concentrate used in this example had the following composition: 50.8% Zn; 8.73% Fe; 0.40% Cu; 1.21% Pb; 33.2% S; 1.09% $SiO_2$; and 72 ppm Ag. The concentrate was ground such that 95% passed through a 325 mesh Tyler screen (44 microns).

The zinc oxide fume had the following composition: 69.0% Zn; 0.31% Fe; 0.024% Cu; 9.98% Pb; 0.47% S; 0.30% $SiO_2$; and 34 ppm Ag. The zinc oxide fume also contained 0.175% As and 31 ppm F.

Mixtures of the zinc sulphide concentrate and zinc oxide fume were leached in spent electrolyte, analysing 161 g/L $H_2SO_4$ and 50 g/L Zn, under the following conditions:

150° C.
700 kPa $O_2$ partial pressure (100 psi)
1050 kPa total pressure (150 psi)
0.2 g/L Lignin sulphonate
60 minutes retention time Iron (2 g/L Fe as ferric sulphate) was added to the leach charge to provide initial soluble iron in the pressure leach.

The amounts of zinc concentrate and zinc oxide fume were varied so that the excess acid, based on the total zinc in the feed mixture, ranged from 26 to 62% as shown in the table below.

| Test No. | Electrolyte Volume (L) | Zinc Concentrate (g) | Zinc Fume (g) | Excess Acid (%) |
| --- | --- | --- | --- | --- |
| 1 | 2.5 | 209 | 155 | 26 |
| 2 | 2.5 | 174 | 128 | 52 |
| 3 | 2.5 | 163 | 121 | 62 |

In all of the tests, the weight ratio of zinc concentrate to zinc oxide fume was 1.35:1.0. In the mixture, equal amounts of zinc were supplied by the zinc concentrate and zinc oxide fume.

The leach test results are given in the following tables.

| Test No. | Solution Analysis (g/L) | | | | | | Extractions (%) | | |
| --- | --- | --- | --- | --- | --- | --- | --- | --- | --- |
| | Zn | Cu | Fe | $H_2SO_4$ | As | F | Zn | Cu | Fe |
| 1 | 138 | 0.27 | 7.0 | 28 | 0.13 | 0.036 | 97.9 | 72.6 | 61.4 |
| 2 | 121 | 0.23 | 7.7 | 57 | 0.16 | 0.030 | 97.7 | 70.5 | 82.2 |
| 3 | 117 | 0.20 | 7.2 | 69 | 0.15 | 0.029 | 97.5 | 70.4 | 84.3 |

| Test | Excess Acid in | Solids Weight | Residue Analysis (%) | | |

| No. | Leach (%) | Loss (%) | Zn | Fe | Cu | Pb | S° | S(SO₄) | S | SiO₂ | Ag |
|---|---|---|---|---|---|---|---|---|---|---|---|
| | | | | | | -continued | | | | | |
| 1 | 26 | 68.2 | 3.8 | 6.3 | 0.21 | 15.6 | 48.8 | 2.8 | 58.3 | 2.1 | 0.017 |
| 2 | 52 | 72.0 | 5.0 | 3.3 | 0.26 | 17.4 | 55.1 | 1.8 | 63.7 | 2.1 | 0.020 |
| 3 | 62 | 72.3 | 5.2 | 2.9 | 0.26 | 18.0 | 53.7 | 1.8 | 63.9 | 2.2 | 0.020 |

The metal extractions were calculated from the leach residue weights and compositions. Zinc extractions in all three tests were 97.5 to 97.9%. Maximum iron extractions were 82 to 84% due to the presence of pyrite in the zinc sulphide concentrate. However, in Test 1, iron extraction was lower due to the formation of lead jarosite at the lower final acidity in the leach. In Tests 2 and 3, sufficient acid was available to prevent the formation of lead jarosite. The effect of lead jarosite formation on the grade of the lead residue produced by flotation of the leach residues is shown in Example 2.

Example 2

Flotation of High Acid Leach Residues

The washed leach residues produced in the above high acid leach tests were repulped in water and subjected to flotation. This operation separates the elemental sulphur and unreacted metal sulphides from the lead sulphate and siliceous materials.

Flotation conditions were:
40° C.
15% solids
Dowfroth 200 addition (Dowfroth is a trade name of the Dow Chemical Company for a froth flotation agent which is a liquid polyalcohol of the general formula $CH_3-(OC_3H_6)_n-OH$:)

Results are shown in the following tables.

| | Zn | Fe | Cu | Pb | S° | S(SO₄) | S | SiO₂ | Ag |
|---|---|---|---|---|---|---|---|---|---|
| Flotation of Test 1 (26% Excess Acid) Residue | | | | | | | | | |
| Analysis (%) | | | | | | | | | |
| Concentrate | 5.3 | 4.7 | 0.31 | 5.0 | 72.9 | n.a. | 83.1 | 0.23 | 0.0093 |
| Tailings | 1.4 | 8.9 | 0.03 | 37.4 | 7.9 | 7.5 | 16.5 | 5.3 | 0.029 |
| Distribution (%) | | | | | | | | | |
| Concentrate | 86 | 46 | 95 | 22 | 94 | | 90 | 7 | 33 |
| Tailings | 14 | 44 | 5 | 78 | 6 | | 10 | 93 | 67 |
| Flotation of Test 2 (52% Excess Acid) Residue | | | | | | | | | |
| Analysis (%) | | | | | | | | | |
| Concentrate | 6.5 | 3.6 | 0.33 | 5.0 | 72.3 | | 81.4 | 0.07 | 0.019 |
| Tailings | 0.63 | 2.4 | 0.04 | 50.9 | 3.2 | 7.1 | 10.5 | 8.0 | 0.023 |
| Distribution (%) | | | | | | | | | |
| Concentrate | 97 | 82 | 96 | 21 | 98 | | 96 | 2 | 72 |
| Tailings | 3 | 18 | 4 | 78 | 2 | | 4 | 98 | 28 |

Flotation of the Test 1 residue produced a lead tailings residue grading only 37% Pb because of lead jarosite formation in the pressure leach. In comparison, the flotation of Test 2 residue produced a lead tailings residue grading 51% Pb and only 2.4% Fe.

Efficient separation of elemental sulphur and unreacted metal sulphides in the flotation of the Test 2 residue was demonstrated by the high recoveries of zinc, iron, copper and elemental sulphur to the flotation concentrate.

Example 3

Low Acid Leach

In the low acid leach stage, the leach solution from the high acid leach stage is reacted with an excess of zinc concentrate under pressure leach conditions to neutralize the acid, and precipitate iron and other impurities.

Leach tests were conducted with synthetic high acid leach solutions; the composition of these solutions simulated the leach solutions produced in Example 1. The compositions of the zinc concentrates used in these tests are given below.

| | Analysis (%) | | | | | |
|---|---|---|---|---|---|---|
| | Zn | Fe | Cu | Pb | S | Ag |
| Zinc Concentrate 1 | 53.8 | 8.5 | 0.07 | 1.0 | 31.5 | 0.003 |
| Zinc Concentrate 2 | 51.8 | 8.8 | 0.57 | 0.13 | 34.5 | 0.002 |

Both concentrates were ground to at least 95% minus 325 mesh Tyler 44 (microns).

Conditions for the low acid leaches were as follows:
150° C.
700 kPa O₂ partial pressure (100 psi)
1050 kPa total pressure (150 psi)
0.2 g/L Lignin sulphonate
60 minutes retention time The series of tests conducted with concentrates 1 and 2 examined the effect of concentrate to solution ratio on the extent of acid neutralization and iron precipitation. The results are shown in the following table.

| Test No. | Concentrate Charge (g/L) | Excess Concentrate* (%) | Solution Composition (g/L) | | | | | Residue Analysis (%) | Zinc Extraction (%) |
|---|---|---|---|---|---|---|---|---|---|
| | | | Zn | Cu | Fe | H₂SO₄ | As | Zn | |
| | | | Zinc Concentrate 1 | | | | | | |
| 1 | 68 | Initial Solution: −8 | 119 151 | 0.66 0.70 | 9.0 1.0 | 36 11 | 0.14 <0.05 | 11.6 | 83.3 |

-continued

| Test No. | Concentrate Charge (g/L) | Excess Concentrate* (%) | Solution Composition (g/L) | | | | | Residue Analysis (%) Zn | Zinc Extraction (%) |
| --- | --- | --- | --- | --- | --- | --- | --- | --- | --- |
| | | | Zn | Cu | Fe | $H_2SO_4$ | As | | |
| 2 | 80 | 8 | 152 | 0.69 | 0.8 | 7 | <0.02 | 16.4 | 76.4 |
| 3 | 92 | 24 | 151 | 0.67 | 0.4 | 5 | <0.02 | 16.9 | 74.8 |
| | | | Zinc Concentrate 2 | | | | | | |
| | | Initial Solution: | 113 | 0.63 | 7.8 | 45 | 0.13 | | |
| 4 | 80 | −5 | 153 | 0.97 | 0.9 | 6 | <0.02 | 11.0 | 85.3 |
| 5 | 100 | 19 | 154 | 1.0 | 0.6 | 6.5 | <0.02 | 19.7 | 72.5 |

*Based on equivalent acid:zinc (in concentrate) mol ratio.

With excess zinc concentrate addition, efficient acid neutralization and iron precipation is achieved. The results show that approximately 20% excess zinc concentrate will reduce the acid concentration to about 5 to 7 g/L and the iron concentration to about 0.4 to 0.6 g/L.

Arsenic is precipitated from the high acid leach volution due to ferric arsenate formation and coprecipitation with iron oxides.

In the tests shown in the above examples, acid neutralization and iron removal was insufficient for the solution to proceed to zinc dust purification without a prior iron removal stage. As shown in earlier disclosures, zinc oxide containing material may be added to the leach solution for this purpose, with the precipitated iron compound being separated in an appropriate liquid-solid separation operation.

Only about 75% of the zinc is extracted from the concentrate in the low acid leach. However, in the preferred flowsheet (as shown in FIG. 1), the unreacted zinc sulphide can be floated from the low acid leach residue and the flotation concentrate treated in the high acid leach stage. Flotation of the low acid leach residue is illustrated in Example 4.

Example 4

Flotation of Low Acid Leach Residue

Washed leach residue produced in Test 3 of Example 3 was subjected to flotation under conditions similar to those for the high acid leach residues. The results are shown in the following table.

| Flotation of Test 3 Low Acid Leach Residue | | | | | | | | | |
| --- | --- | --- | --- | --- | --- | --- | --- | --- | --- |
| | Zn | Fe | Cu | Pb | S° | S(SO$_4$) | S | SiO$_2$ | Ag |
| Analysis (%) | | | | | | | | | |
| Feed Residue | 16.9 | 21.6 | 0.036 | 1.11 | 24.4 | n.a. | 42.0 | 1.08 | 0.0034 |
| Concentrate | 28.8 | 5.5 | 0.031 | 0.08 | 35.2 | n.a. | 61.4 | 0.05 | 0.0034 |
| Tailings | 2.0 | 41.8 | 0.043 | 2.4 | 10.9 | 1.9 | 17.6 | 1.36 | 0.0035 |
| Distribution (%) | | | | | | | | | |
| Concentrate | 95 | 15 | 50 | 4 | 80 | | 81 | 3 | 55 |
| Tailings | 5 | 85 | 50 | 96 | 20 | | 19 | 97 | 45 |

Zinc recovery to the flotation concentrate was 95%. The iron rejected to the flotation tailings as iron oxide represents the major iron elimination from the various feeds to the flowsheet.

The lead distribution in the flotation demonstrates that low lead zinc concentrates are preferred for the low acid leach. The lead sulphide is converted to lead sulphate and/or lead jarosite which is lost to the flotation tailings with the iron oxide.

What we claim as new and desire to protect by Letters Patent of the U.S. is:

1. A process for the recovery of zinc from zinc-containing sulphidic material which also contains iron and from zinc oxide containing material, at least one of said materials containing values of at least one metal selected from the group consisting of lead and silver, the process comprising leaching zinc-containing sulphidic material and zinc oxide containing material together under pressurized oxidizing conditions at a temperature in the range of from about 130° to about 170° C. in aqueous sulphuric acid solution with a stoichiometric excess of sulphuric acid relative to the zinc content of the materials of from about 40 to about 100% to produce a residue containing elemental sulphur and a major proportion of said at least one metal value and a leach solution containing a major proportion of zinc and iron, the proportion of zinc containing sulphidic material and zinc oxide containing material in said leaching with said stoichiometric acid excess being in the range of from about 1.1:1 to about 1.3:1 by weight, the zinc oxide chemically consisting of zinc and oxygen only, separating the residue from the leach solution, treating the residue to recover values of said at least one metal; raising the pH of the leach solution to neutralize the acid in an iron removal step to cause precipitation of at least some of the dissolved iron from the leach solution as an iron compound, separating the precipitated iron compound from the remaining leach solution, and treating the remaining leach solution to recover zinc.

2. A process according to claim 1 wherein the iron removal step is carried out under pressurized oxidizing conditions at a temperature in the range of from about 130° to about 170° C., and the pH is raised in said removal step by the addition of zinc-containing sulphidic material.

3. A process according to claim 2 wherein undissolved zinc-containing sulphidic material is separated from the remaining leach solution with the precipitated iron compound, and the process includes separating the zinc-containing sulphidic material from the precipitated iron compound, and passing the separated zinc-containing material to said leaching with said stoichiometric acid excess.

4. A process according to claim 1 comprising physically separating elemental sulphur from remaining residue containing said at least one metal.

* * * * *